United States Patent
Bergmann et al.

[11] Patent Number: 6,055,101
[45] Date of Patent: Apr. 25, 2000

[54] ISOLATOR ASSEMBLY AND METHOD OF MAKING

[75] Inventors: Ernest E. Bergmann, Fountain Hill; William L. Emkey, Bethlehem, both of Pa.

[73] Assignee: Lucent Technologies, Inc., Murray Hill, N.J.

[21] Appl. No.: 09/141,565

[22] Filed: Aug. 28, 1998

[51] Int. Cl.[7] ..................................................... G02B 5/30
[52] U.S. Cl. ......................... 359/484; 359/497; 359/500; 385/11
[58] Field of Search ..................... 359/484, 494, 359/495, 497, 500; 385/11, 31

[56] References Cited

U.S. PATENT DOCUMENTS

| | | |
|---|---|---|
| 4,974,944 | 12/1990 | Chang ..................................... 359/484 |
| 5,446,813 | 8/1995 | Lee et al. . |
| 5,499,307 | 3/1996 | Iwatsuka . |
| 5,559,633 | 9/1996 | Emkey . |
| 5,566,259 | 10/1996 | Pan et al. . |
| 5,774,264 | 6/1998 | Konno et al. . |
| 5,808,793 | 9/1998 | Chang et al. ........................... 359/484 |
| 5,835,270 | 11/1998 | Urino et al. ............................ 359/484 |

*Primary Examiner*—Darren E. Schuberg
*Attorney, Agent, or Firm*—Dickstein Shapiro Morin & Oshinsky, LLP

[57] ABSTRACT

An isolator assembly eliminates optical feedback or return beams in multiple stages. The isolator assembly employs passive optical components, including birefringent walk-off plates and non-reciprocal rotation plates. The rotation plates are located adjacent the walk-off plates. The optical components form a compact, integral unit. In the forward direction, the isolator assembly translates a polarized component beam through a triangular path to first separate and then combine the beam with respect to an orthogonally polarized component beam. By alternating birefringent sheets and rotation sheets, several isolator assemblies may be produced from a single layered stack.

28 Claims, 3 Drawing Sheets

ISOLATOR ASSEMBLY AND METHOD OF MAKING

BACKGROUND OF THE INVENTION

1. Field of the Invention

The present invention relates generally to the field of optical devices. More particularly, the invention relates to optical isolators and methods of preventing optical feedback. The invention also relates to methods of making optical isolator assemblies.

2. Description of the Related Art

Silica-based optical fiber is widely used for communication systems. To effectively utilize optical fiber systems, a variety of in-line optical components have been created to deal with physical limitations or to boost line efficiency. However, the placement of components into optical fiber lines, while solving some problems, also creates new problems. One such problem which plagues optical communication systems is the occurrence of diverse return beams, also known as reflections, originating from components spliced into the optical fiber.

Diverse return beams cause a variety of negative effects, including disruption of the oscillation of a laser or light source and disruption of amplifiers within the line. Optical isolators are used to reduce or eliminate the negative effects of diverse return beams. Isolators allow transmission of optical beams in a forward direction while eliminating any beam traveling in the reverse direction.

Prior art devices, characterized by half-wave plates, generally require precise alignment of components. The assembly of these devices has traditionally been performed on an individual basis (one at a time) because of the need for precise angular and translational alignment of each component. In addition, the prior art devices may be sensitive to wavelength, temperature and other conditions.

U.S. Pat. No. 5,774,264 (Konno) describes an isolator with three birefringent plates and two Faraday rotators. The isolator described in the Konno patent purportedly reduces polarization dispersion. U.S. Pat. No. 5,499,307 (Iwatsuka) shows an isolator design using two birefringent plates separated by a Faraday rotator and a half-wave plate. U.S. Pat. No. 5,446,813 (Lee) describes the use of a first lens to converge incoming beams into parallel beams in connection with an isolator assembly including first and second birefringent plates separated by a Faraday rotator.

U.S. Pat. No. 5,559,633 (Emkey) describes an optical isolator that has a non-reciprocal rotator disposed between birefringent wedges. The Emkey patent also describes the use of an above normal incident angle of an incoming light beam to reduce walk-off effects. U.S. Pat. No. 5,566,259 (Pan) shows the use of two successive stages of isolation, each incorporating birefringent wedges separated by a Faraday rotator.

SUMMARY OF THE INVENTION

The disadvantages of the prior art are overcome to a great extent by the present invention. The invention relates to an apparatus for isolating an optical beam. The apparatus has walk-off components that first separate the beam into orthogonally polarized component beams, and then combine the component beams into a reformed beam of mixed polarization. The apparatus also has non-reciprocal rotation components for rotating the polarizations of the orthogonally polarized component beams. The non-reciprocal rotation components are located between the walk-off components. Preferably, the walk-off components and the rotation components are located adjacent each other, forming a single integral unitary device.

In a preferred embodiment of the invention, the walk-off components are formed of birefringent material. Birefringent material has the property of dividing a light ray into at least two separate, polarized rays. The walk-off components may be formed of a birefringent crystal material such as calcite, lithium niobate, rutile, lithium tantalate, or yttrium orthovanadate.

In one aspect of the invention, the thicknesses of the walk-off components along the optical axis are proportional to the sides of a triangle. The crystal axes of the walk-off components may be successively rotated about one hundred thirty five degrees relative to each other about an axis perpendicular to the end faces of the components. By appropriately selecting the thicknesses and crystal orientations of the walk-off plates, the translation of the first beam can be controlled so that it is walked in a closed triangular pattern (as seen from an end view of the assembly), so that the polarized component beams recombine upon exiting the isolator assembly. The present invention is not limited to the preferred embodiments described and illustrated herein.

In another aspect of the invention, the non-reciprocal rotation components are Faraday rotators. The rotators may be arranged to rotate the polarizations of transmitted beams through about forty five degrees. In a preferred embodiment of the invention, the rotators are formed of latched garnet crystals. Alternatively, the rotators may be formed of other optical materials.

According to the present invention, optical beam isolation occurs because a reverse propagating beam experiences lateral displacement such that the exiting beams will not reenter the optical fiber line. The walk-off and non-reciprocal rotator components operate to first split the reverse propagating beam into two orthogonal components, and then they laterally displace the beams in successive stages. Because of the non-reciprocal nature of the rotator components, the beams become more physically displaced in each walk-off component. In the reverse direction, the beams do not follow the closed triangular path experienced by a forward propagating beam.

An advantage of the invention is that it can be practiced without wave plates, including half-wave plates. By avoiding the use of wave plates, the invention eliminates the wavelength dependence of known isolators. In addition, the invention reduces the number of components in each stage. The invention may also be less temperature dependent than prior art isolator devices.

Another advantage of the invention is that it does not require precise angular orientation between its various components.

The present invention also relates to an apparatus having two identical isolators assembled together in series. The apparatus may provide reduced polarization mode dispersion (PMD). According to this aspect of the invention, the second isolator cancels polarization mode dispersion created by the first. Polarization mode dispersion occurs when component light beams with different polarizations travel different optical distances. According to the present invention, in the first isolator, one beam (the ordinarily polarized or "O-polarized" beam) travels essentially straight through the device. The other beam (the extraordinarily polarized or "E-polarized" beam) travels a different optical distance because it is displaced by the walk-off components and therefore experiences different optical paths and different effective indices of refraction. Using two isolators in series and in connection with a reciprocal polarization interchanger takes advantage of the reversal in polarization of the beams as they are transmitted through the first isolator. That is, the beam which was O-polarized in the first isolator is E-polarized in the second and vice versa.

According to another aspect of the invention, an isolator assembly is cut, diced or otherwise removed from a preformed stack of sheets or slabs. The plates in the stack may be integrally held together, in close proximity, by epoxy or by other suitable instrumentalities. Thus, the invention also relates to a method of making an isolator assembly. The method involves the steps of forming a stack or plywood-like structure of planar optical components, and then cutting the isolator assembly from the stack.

The above and other advantages and features of the invention will become apparent from the following detailed description of the invention which is provided in conjunction with the accompanying drawings.

DETAILED DESCRIPTION OF PREFERRED EMBODIMENTS

Figure 1:
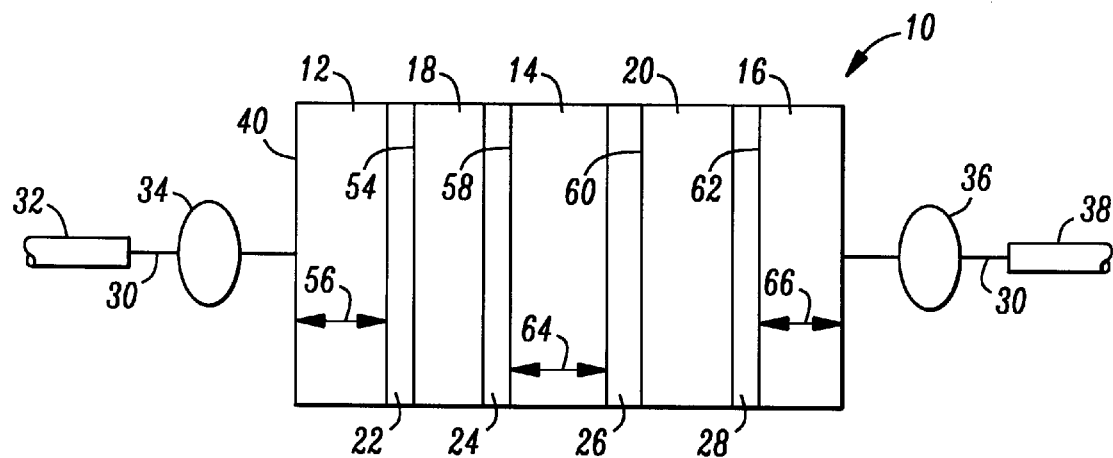
FIG. 1 is a side view of an optical device constructed in accordance with a preferred embodiment of the present invention.

Referring now, to the drawings, where like reference numerals designate like elements, there is shown in FIG. 1 an optical isolator assembly 10 constructed in accordance with the invention. The isolator assembly 10 has first, second and third walk-off plates 12, 14, 16 and first and second Faraday rotation plates 18, 20. The walk-off plates 12–16 and the rotation plates 18, 20 may be connected to each other by layers of epoxy resin 22, 24, 26, 28.

In operation, a light beam 30 is transmitted by an incoming optical fiber 32. The beam 30 is collimated by a collimator lens 34. The collimated beam 30 propagates through the isolator assembly 10 (from left to right as viewed in FIG. 1). Then the beam 30 is converged by an objective lens 36 and transmitted into an outgoing optical fiber 38. As discussed in more detail below, a feedback return beam (not shown in FIG. 1) transmitted from the outgoing fiber 38 toward the isolator assembly 10 (from right to left as viewed in FIG. 1) is not transmitted into the incoming fiber 32.

In the illustrated embodiment, the incoming beam 30 is not polarized. The position and polarization state of the incoming beam 30 at the forward (incident) face 40 of the first walk-off plate 12 are designated in FIG. 2 by a circle containing horizontal and vertical lines.

The first walk-off plate 12 is formed of a birefringent material. The first walk-off plate 12 splits the incoming beam 30 into linearly and orthogonally polarized component beams 50, 52. The component beams 50, 52 are transmitted in parallel from the first walk-off plate 12 to the first Faraday rotation plate 18. At the forward face 54 of the first rotation plate 18, the first component beam 50 is horizontally polarized, and the second component beam 52 is vertically polarized.

In addition, the second component beam 52 is translated downward away from the first component beam 50. The extent to which the component beams 50, 52 are translationally separated is a function of the length 56 (FIG. 1) of the first walk-off plate 12. The respective positions and polarization states of the component beams 50, 52 at the forward face 54 of the first rotation plate 18 are designated by a first circle containing a horizontal line (horizontal polarization) and a second circle containing a vertical line (vertical polarization).

Figure 2:
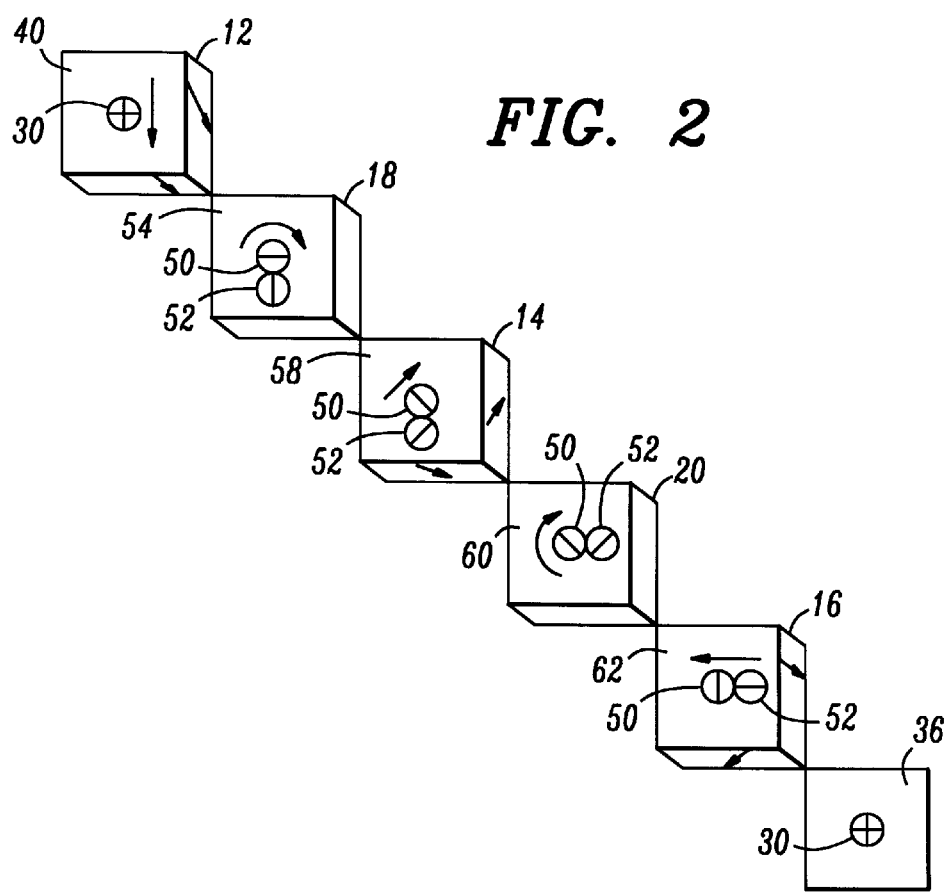
FIG. 2 is an exploded schematic diagram of the device of FIG. 1, showing light propagating in a forward direction.

The first rotation plate 18 rotates the polarizations of the component beams 50, 52 through about forty five degrees (clockwise as viewed in FIG. 2). The first rotation plate 18 does not affect the translation positions of the component beams 50, 52. The component beams 50, 52 are transmitted in parallel from the first rotation plate 18 to the second walk-off plate 14. The respective positions and polarization states of the component beams 50, 52 at the forward face 58 of the second walk-off plate 14 are shown in FIG. 2.

The second walk-off plate 14 may be formed of the same birefringent material as the first walk-off plate 12. The material of the second walk-off plate 14 is rotated by about one hundred thirty five degrees with respect to the material of the first walk-off plate 12, about an axis that is perpendicular to the forward faces 40, 58 of the first and second walk-off plates 12, 14. The second walk-off plate 14 translates the second component beam 52 upwardly and horizontally. The component beams 50, 52 are transmitted in parallel from the second walk-off plate 14 to the second rotation plate 20. The respective positions and polarization states of the component beams 50, 52 at the forward face 60 of the second rotation plate 20 are shown in FIG. 2.

An advantage of the invention is that no more than one birefringent component is needed between the first and second rotation plates 18, 20. The present invention may be practiced with only three birefringent components.

The second rotation plate 20 rotates the polarizations of the component beams 50, 52 through about forty five degrees (clockwise as viewed in FIG. 2). The second rotation plate 20 does not affect the translation positions of the component beams 50, 52. The component beams 50, 52 are transmitted in parallel from the second rotation plate 20 to the third walk-off plate 16. The respective positions and polarization states of the component beams 50, 52 at the forward face 62 of the third walk-off plate 16 are shown in FIG. 2.

The third walk-off plate 16 may be formed of the same birefringent material as the first and second walk-off plates 12, 14. The material of the third walk-off plate 16 is rotated by about one hundred thirty five degrees with respect to the material of the second walk-off plate 14, about an axis that is perpendicular to the forward faces 58, 62 of the second and third walk-off plates 14, 16. The orientations of the crystal axis of the walk-off plates 12–16 are designated by straight arrows in FIG. 2. Three straight arrows are shown on each of the walk-off plates 12, 14, 16. The straight arrows represent projections of the crystal axis on the respective orthogonal surfaces of the plates 12, 14, 16. The arrowheads on the straight arrows suggest the translation direction of the second component beam 52 as the second component beam 52 propagates from the upper left of FIG. 2 to the bottom right of FIG. 2.

The third walk-off plate 16 horizontally translates the second component beam 52. The third walk-off plate 16 causes the second component beam 52 to become coincident with the first component beam 50, to thereby reform the beam 30 as a beam of mixed polarization. The beam 30 is converged by the objective leans 36 into the outgoing fiber 38. The position and polarization state of the reformed beam 30 incident on the objective lens 36 are represented in FIG. 2.

The component beams 50, 52 physically recombine, to reform the beam of mixed polarization 30, because of the relative crystal orientations and relative thicknesses of the three walk-off components 12–16. In the illustrated embodiment, the translational movements of the second component beam 52 (i.e., the movements in directions perpendicular to the incoming beam 30) form the three sides of an isosceles triangle. The three translational movements of the second component beam 52 are proportional to the respective lengths 56, 64, 66 of the walk-off plates 12–16 (FIG. 1). Accordingly, in the illustrated embodiment, the lengths 56, 64, 66 of the first, second and third walk-off plates 12–16 are in the following ratio: $1:\sqrt{2}:1$. The lengths 54, 66 of the first and third walk-off plates 12, 16 may be equal to each other. The length 64 of the second walk-off plate 14 may be greater than those of the first and third walk-off plates 12, 16 by a factor of $\sqrt{2}$ (i.e., about 1.4).

Figure 3:
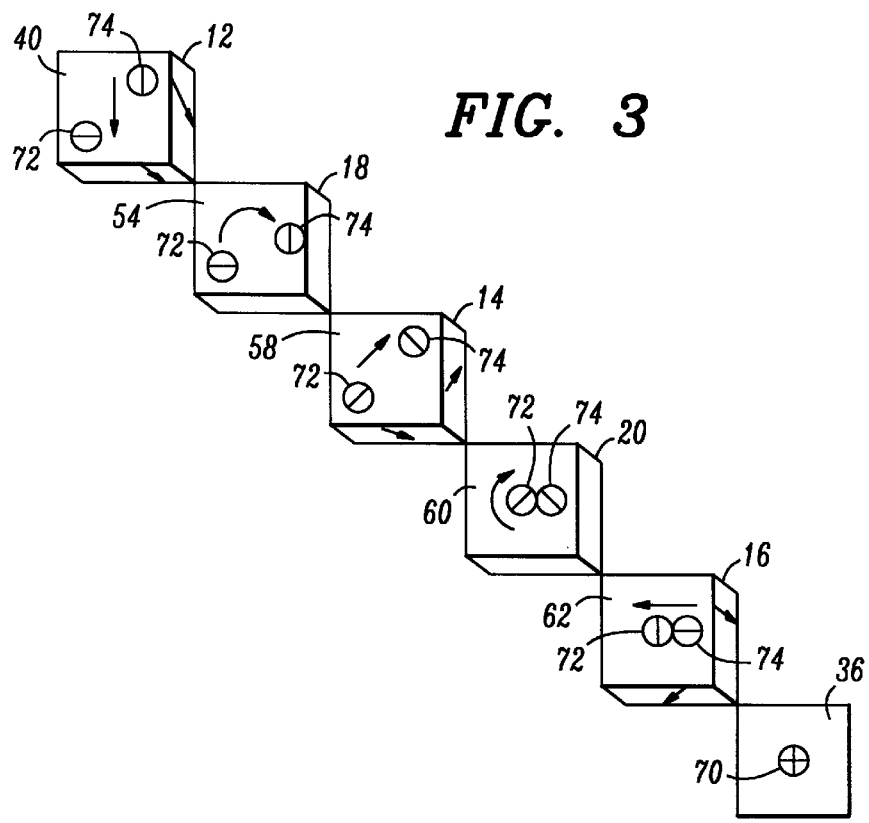
FIG. 3 is another exploded schematic diagram of the device of FIG. 1, showing light propagating in a reverse direction.

FIG. 3 illustrates the propagation of light through the isolator assembly 10 in the reverse direction (from right to left as viewed in FIG. 1). The third walk-off plate 16 splits a returning beam 70 (coming from the outgoing fiber 38) into two linearly and orthogonally polarized component beams 72, 74. At the forward face 62 of the third walk-off plate 16, the first component beam 72 is vertically polarized, and the second component beam 74 is horizontally polarized. In addition, the second component beam 74 is translated horizontally away from the first component beam 72. The respective positions and polarization states of the component beams 72, 74 at the forward face 62 of the third walk-off plate 16 are designated by circles containing vertical and horizontal lines.

The second rotation plate 20 rotates the polarizations of the component beams 72, 74 through about forty five degrees (clockwise as viewed in FIG. 3). Then the second walk-off plate 14 translates the first component beam 72 downwardly and horizontally away from the second component beam 74. Then the first rotation plate 18 rotates the polarizations of the component beams 72, 74 through about forty five degrees (clockwise as viewed in FIG. 3). And then the first walk-off plate 12 causes the second component beam 74 to move upwardly, even further away from the first component beam 72. The component beams 72, 74 emerging from the first walk-off plate 12 are not converged by the collimator lens 34 and are not transmitted into the incoming fiber 32. The respective positions and polarization states of the component beams 72, 74 at the forward faces 40, 58, 54 of the first and second walk-off plates 12, 14 and the first rotation plate 18 are shown in FIG. 3.

The illustrated isolator assembly 10 may be used by itself to isolate the single beam 30. Alternatively, the isolator assembly 10 may be used to isolate multiple parallel incoming beams, where all of the incoming beams propagate in the direction of the beam 30 shown in FIG. 1.

Figure 4:
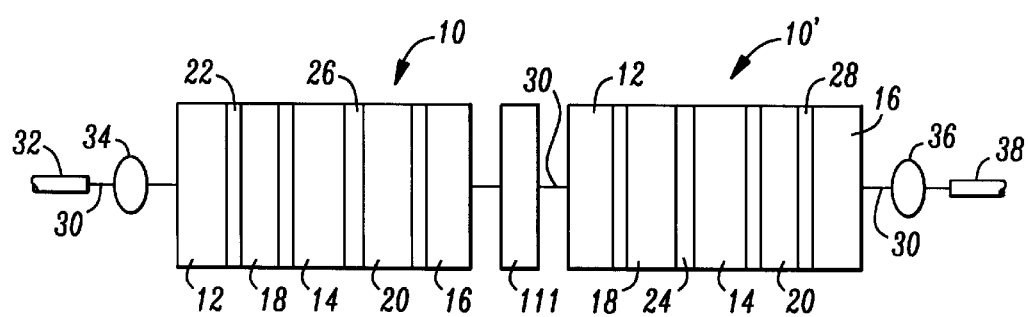
FIG. 4 is a schematic side view of series-connected optical devices constructed in accordance with the invention.

Moreover, the isolator assembly 10 may be used in combination with other elements or devices to reduce optical effects such as polarization mode dispersion. FIG. 4 shows two identical isolator assemblies 10, 10' connected in series to eliminate polarization mode dispersion. To increase isolation potential the second isolator assembly 10' is rotated by a predetermined angle (ninety degrees in the illustrated embodiment) about an axis perpendicular to the end faces of the isolator assemblies 10, 10'. A reciprocal polarization interchanger 111 is located between the isolator assemblies 10, 10'. The reciprocal polarization interchanger 111 may be a half-wave plate or an optically active device.

The reciprocal polarization interchanger 111 causes the component beams 50, 52 to effectively) exchange polarization modes, so that the E-polarized beam in assembly 10 becomes O-polarized in assembly 10' and vice versa. The O-polarized component beam 50 (the one with the more direct optical path) in the first isolator assembly 10 is the E-polarized component beam 52 (the one with the deviated optical path) in the second isolator assembly 10', and vice versa. Consequently, the system shown in FIG. 4 uses the second isolator assembly 10' to cancel polarization mode dispersion created by the first isolator assembly 10.

Figure 5:
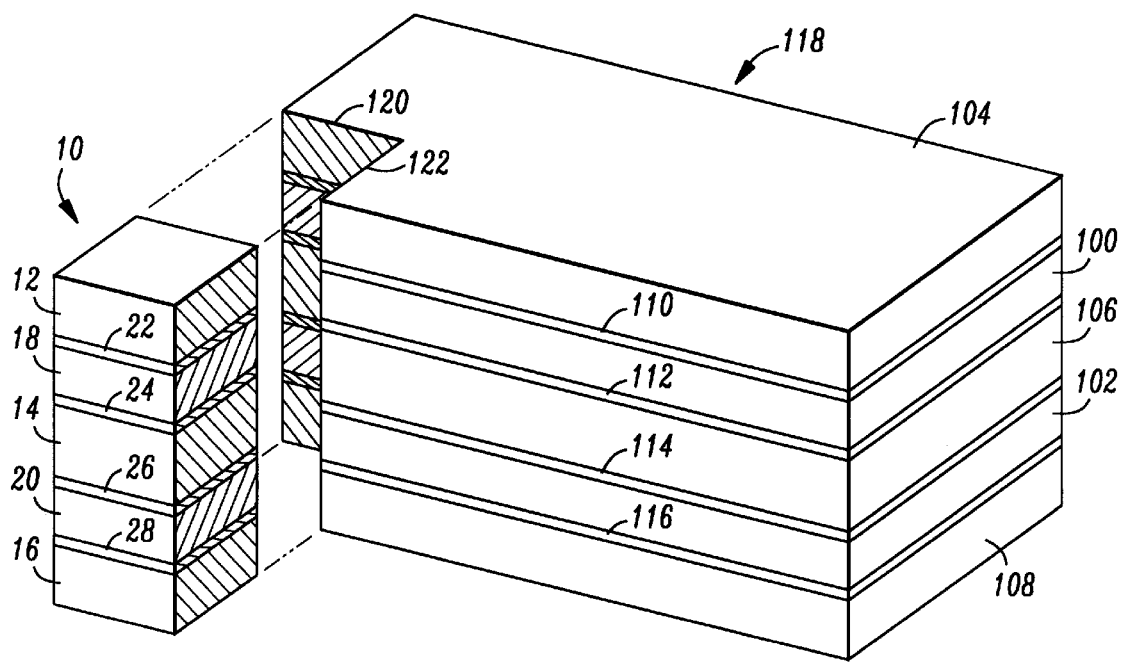
FIG. 5 illustrates a method of making isolator assemblies in accordance with the present invention.

FIG. 5 illustrates a method of making the isolator assembly 10. Sheets of latched garnet material 100, 102 are sandwiched between coextensive sheets of birefringent material 104, 106, 108 having the desired thicknesses and crystal axis orientations. The sheets (or slabs) 100–108 may be secured to each other in parallel by suitable layers of cured epoxy 110, 112, 114, 116 to form a layered plywood-like structure 118. The plywood-like structure 118 may be cut or diced along planes 120, 122 to produce the isolator assembly 10. Numerous other isolator assemblies 10 may be similarly cut from the plywood-like structure 118.

An advantage of the invention is that the birefringent and rotation plates 12–20 are all located in close proximity to each other. The plates 12–20 are preferably integrally connected to each other to form a single unitary product. The layers of epoxy 22–28, which provide integral connections between the optical plates 12–20, may be thin. The epoxy layers 22–28 preferably are transparent at the operating wavelength of the beam 30 and if the index of diffraction is different from that of the adjacent plates 12–20, the adjacent plates 12–20 preferably have an anti-reflective (AR) coating for the index of refraction of the epoxy layers 22–28. The faces of the optical plates 12–20 (i.e., the surfaces approximately normal to the optical path) may all be planar and parallel to each other. It may be desirable to have the beams at a small angle to the normal of the interfaces (surfaces) so that inadvertent reflections from these surfaces are not coupled back to the input. The illustrated arrangement provides for the production of compact and rugged isolator assemblies 10 from a stack of integrally adhered sheets 100–108.

While the invention has been described in detail in connection with preferred embodiments known at this time, it should be understood that the invention is not limited to the disclosed embodiments. The invention can be modified to incorporate any number of variations, alterations, substitutions or equivalent arrangements not heretofore described, but which are commensurate with the spirit and scope of the invention. The invention is not to be seen as limited by the foregoing description, but is only limited by the scope of the appended claims.

What is claimed as new and desired to be protected by Letters Patent of the United States is:

1. An apparatus for isolating an optical beam, said apparatus comprising:
   a first isolator device, including:
      walk-off components for separating the beam into polarized component beams and for combining the polarized component beams; and non-reciprocal rotation components for rotating the polarizations of the polarized component beams, said non-reciprocal rotation components being located between said walk-off components, and wherein said walk-off components and said non-reciprocal rotation components are adjacent each others; and a second isolator device, including:
walk-off components for separating the beam into polarized component beams and for combining the polarized component beams; and
non-reciprocal rotation components for rotating the polarizations of the polarized component beams, said non-reciprocal rotation components being located between said walk-off components, and wherein said walk-off components and said non-reciprocal rotation components are adjacent each other; and
a reciprocal polarization interchanger, said reciprocal polarization interchanger being located between said first and second isolator devices.

2. The apparatus of claim 1, wherein said walk-off components are formed of birefringent material.

3. The apparatus of claim 2, wherein said walk-off components include first, second and third walk-off plates.

4. The apparatus of claim 3, wherein the thickness of said first walk-off plate is approximately equal to the thickness of said third walk-off plate.

5. The apparatus of claim 4, wherein said second walk-off plate is rotated approximately one hundred thirty five degrees about an axis perpendicular to the end face of said first walk-off plate, and wherein said third walk-off plate is rotated approximately one hundred thirty five degrees about an axis perpendicular to the end face of said second walk-off plate.

6. The apparatus of claim 5, wherein said non-reciprocal rotation components include first and second Faraday rotation plates.

7. The apparatus of claim 6, wherein said first rotation plate rotates the polarizations of the component beams by about forty five degrees.

8. The apparatus of claim 7, wherein said second rotation plate rotates the polarizations of the component beams by about forty five degrees.

9. The apparatus of claim 8, wherein said rotation plates are formed of latched garnet crystal material.

10. An isolator apparatus, comprising:
a first isolator device, including:
first walk-off plates for separating an incoming beam into orthogonally polarized beams and for combining the polarized beams into a beam of mixed polarization; and
first non-reciprocal rotation plates for changing the polarizations of the orthogonally polarized beams, said non-reciprocal rotation plates being located between said walk-off plates, and wherein said walk-off plates and said non-reciprocal rotation plates are adjacent each other; and
a second isolator device, including:
second walk-off plates for separating the beam of mixed polarization into polarized component beams and for combining the polarized component beams; and
second non-reciprocal rotation plates located between said second walk-off plates; and
a reciprocal polarization interchanger, said reciprocal polarization interchanger being located between said first and second isolator devices.

11. The apparatus of claim 10, wherein at least one of said first walk-off plates is formed of birefringent material.

12. The apparatus of claim 10, wherein at least one of said first rotation plates is a Faraday rotator.

13. The apparatus of claim 10, wherein said second walk-off plates are substantially identical to said first walk-off plates, and wherein said second rotation plates are substantially the same as said first rotation plates.

14. The apparatus of claim 10, further comprising a lens for collimating the incoming beam and for transmitting the incoming beam into said first walk-off plates.

15. The apparatus of claim 10, wherein said second isolator device is rotated about an axis perpendicular to the end face of said first isolator device by approximately ninety degrees.

16. The apparatus of claim 10, wherein said reciprocal polarization interchanger is a half-wave plate.

17. The apparatus of claim 10, wherein said reciprocal polarization interchanger is an optically active device.

18. A device for isolating an optical beam, said device comprising:
a first isolator device, including:
birefringent plates for splitting the optical beam into polarized component beams and for combining the component beams; and
non-reciprocal rotation plates for rotating the polarizations of the component beams, said non-reciprocal rotation plates being located between said birefringent plates, and wherein said device is cut from a stack of sheets; and
a second isolator device, including:
birefringent plates for splitting the optical beam into polarized component beams and for combining the component beams; and
non-reciprocal rotation plates for rotating the polarizations of the component beams, said non-reciprocal rotation plates being located between said birefringent plates; and
a reciprocal polarization interchanger, said reciprocal polarization interchanger being located between said first and second isolator devices.

19. The device of claim 18, wherein said birefringent plates include first, second and third walk-off plates, and wherein the thickness of said first walk-off plate is approximately equal to the thickness of said third walk-off plate.

20. The device of claim 19, wherein said second walk-off plate is rotated approximately one hundred thirty five degrees about an axis perpendicular to the end face of said first walk-off plate, and wherein said third walk-off plate is rotated approximately one hundred thirty five degrees about an axis perpendicular to the end face of said second walk-off plate.

21. A method of making an isolator assembly, said method comprising the steps of:
providing first, second and third birefringent sheets;
locating a first rotation sheet between said first and second birefringent sheets;
locating a second rotation sheet between said second and third birefringent sheets;
subsequently, cutting through said first, second and third birefringent sheets and said rotation sheets, to form a pair of isolator devices; and
placing a reciprocal polarization interchanger between said pair of the isolator devices to establish an optical patch through said isolator devices and said polarization interchanger.

22. The method of claim 21, further comprising the step of integrally attaching said first rotation sheet to said first birefringent sheet, said attaching step occurring prior to said cutting step.

23. The method of claim 22, wherein said first rotation sheet and said first birefringent sheet are attached to each other by epoxy resin.

24. The method of claim 23, further comprising the step of optically coupling an incoming optical fiber to a portion of said first birefringent sheet.

25. The method of claim 24, further comprising the step of optically coupling an outgoing optical fiber to a portion of said third birefringent sheet.

26. The method of claim 25, further comprising the step of providing said first, second and third birefringent sheets with different crystal axis orientations.

27. The method of claim 26, further comprising the step of forming said rotation sheets of latched garnet crystal material.

28. An apparatus for isolating an optical beam, said apparatus comprising:
- a first isolator device;
- a second isolator devices; and
- a reciprocal polarization interchanger optically coupled with said pair of isolator devices.

* * * * *